No. 657,035. Patented Aug. 28, 1900.
O. W. SKORKOWSKY.
SEAT ATTACHMENT FOR HARROWS.
(Application filed May 19, 1900.)
(No Model.)
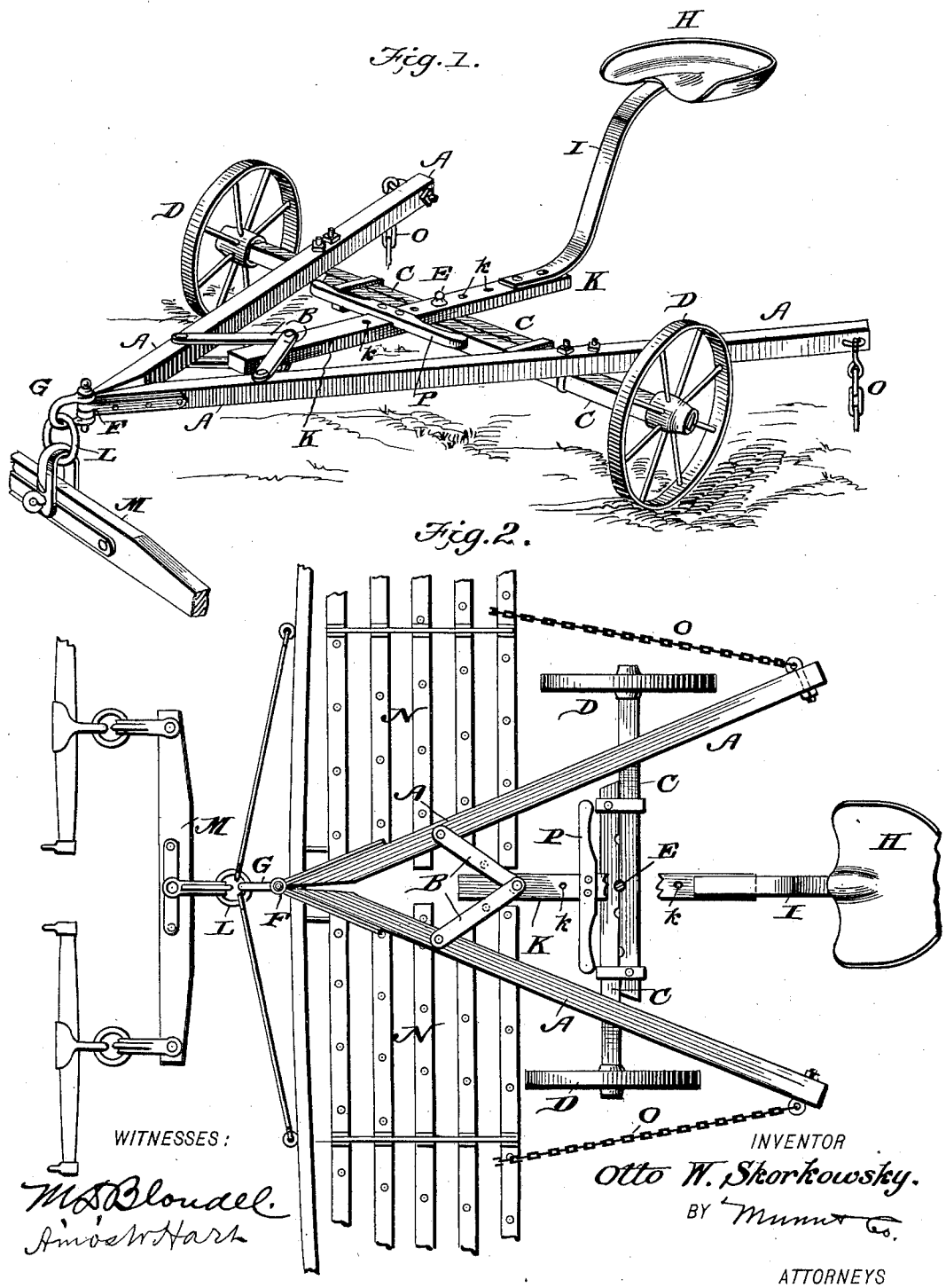
WITNESSES:
M. Bloudel.
Amos W Hart
INVENTOR
Otto W. Skorkowsky.
BY Munn & Co.
ATTORNEYS
THE NORRIS PETERS CO., PHOTO-LITHO., WASHINGTON, D. C.

UNITED STATES PATENT OFFICE.

OTTO WILLIAM SKORKOWSKY, OF HARRAH, OKLAHOMA TERRITORY.

SEAT ATTACHMENT FOR HARROWS.

SPECIFICATION forming part of Letters Patent No. 657,035, dated August 28, 1900.

Application filed May 19, 1900. Serial No. 17,251. (No model.)

*To all whom it may concern:*

Be it known that I, OTTO WILLIAM SKORKOWSKY, residing at Harrah, in the county of Oklahoma and Territory of Oklahoma, have made certain new and useful Improvements in Seat Attachments for Harrows, &c., of which the following is a specification.

It is the object of my invention to provide an improved wheeled attachment for harrows or other analogous agricultural implements, whereby the driver's seat proper is carried and adapted for adjustment, so as to counterbalance the draft appliances of the harrow or other implement.

The invention also includes means for steadying the harrow and assisting in making short turns at the corners of the field.

The details of construction, arrangement, and operation are as hereinafter described, reference being had to the accompanying drawings, in which—

Figure 1 is a perspective view of my invention. Fig. 2 is a plan view showing my invention connected with a harrow, part being broken away.

The frame proper of my seat-support is A-shaped, being composed of two bars A A, secured together at their front ends and diverging at an acute angle. They are connected near their front ends by two sets of cross-bars B, which are jointed together at their inner ends and pivoted to the bars A at their outer ends.

The bars A A are bolted upon the respective halves C C of an axle having light-running wheels D. The two parts C C of said axle are lapped upon each other, each sliding in keepers c, as shown in Fig. 2. The axle is thus adapted to be lengthened or shortened, as required to accommodate the wheels D to run any desired distance apart, according to the crop being cultivated. The two parts are secured in any adjustment by a bolt E, which passes through any hole formed by the coincidence of any two of a series of vertical grooves formed in the adjacent or inner sides of the parts C C.

The frame-bars A A are connected at their front ends by a hinge F, to which a clevis G is applied, as shown. It is apparent that such hinge F and the jointed and pivoted bars B permit the frame A A to be widened or contracted, corresponding with the adjustment of the axle in respect to length.

The driver's seat H is secured to a curved plate-spring I, whose foot is bolted to the rear end of a bar K, arranged midway between the rear ends of the frame-bars A A and secured to the axle by means of the same bolt E that holds the axle parts C C in any desired adjustment. The front end of each seat-bar K projects between the two sets of jointed cross-bars B B and is provided with a series of longitudinally-alined holes $k$ for the reception of the bolt E, so that said bar may be adjusted. As shown in the drawings, the seat attachment as a whole is loosely connected by the clevis G with the ring L of the draft-evener M of the harrow N. It is apparent that by adjusting the seat-bar K forward or back on the axle C, as may be required, the driver's weight may be made to counterbalance that of the evener and connected draft appliances, and the aggregate weight of the driver and frame will be borne by the axle and wheels. The draft of the harrow N is not, however, appreciably increased.

Guy-chains O are attached to the rear ends of the frame-bars A A and extended forward to and connected with the two harrow-sections N. Thus the latter are held steadier in their due position, and the entire apparatus may be turned on the wheels D practically within a circle described by its aggregate length, which is a matter of much importance in changing the direction of movement around or across a field.

A foot-rest P for the driver is attached to seat-bar K.

What I claim is—

1. The improved seat attachment for the purpose specified, comprising frame-bars secured together at an angle, an axle and wheels, a seat proper, a seat-supporting bar secured upon the axle, and hinged bars pivoted to the frame-bars, and between which the seat-bar projects, as shown and described.

2. The improved seat attachment, comprising two bars hinged together at their front ends, and fixed to an axle which is adjustable in length, wheels for said axle, a seat proper, and a seat-supporting bar which is secured to the axle, substantially as shown and described.

3. The improved seat attachment comprising two bars hinged together at their front ends, and fixed to an axle which is formed of two lapped parts adapted to slide upon each other, a seat proper, a seat-supporting bar, and a bolt passing through the latter and the axle, and serving to secure the axle parts and seat-bar in any adjustment, as shown and described.

4. The improved seat attachment, comprising two frame-bars arranged at an angle and hinged together at the apex, a clevis attached to said apex, for engagement with and support of a cultivating implement, the two slidable parts composing the axle, to which parts the frame-bars are respectively secured, running-wheels applied to said axle, the seat-supporting bar provided with alined holes to provide for adjustment, a bolt securing the same to the axle parts which are provided with vertical semicircular grooves in their meeting sides, said grooves, when in coincidence, forming holes to receive said bolt, as shown and described.

OTTO WILLIAM SKORKOWSKY.

Witnesses:
GEORGE D. GREEN,
SELDON S. BEAVERS.